(12) United States Patent
Thomsen et al.

(10) Patent No.: US 8,534,416 B2
(45) Date of Patent: Sep. 17, 2013

(54) HYDRAULIC STEERING

(75) Inventors: Svend Erik Thomsen, Nordborg (DK); Tom Rudolph, Sydals (DK); Poul Ennemark, Soenderborg (DK)

(73) Assignee: Sauer-Danfoss Aps, Nordborg (DK)

( * ) Notice: Subject to any disclaimer, the term of this patent is extended or adjusted under 35 U.S.C. 154(b) by 47 days.

(21) Appl. No.: 12/869,847

(22) Filed: Aug. 27, 2010

(65) Prior Publication Data

US 2010/0320024 A1 Dec. 23, 2010

Related U.S. Application Data

(63) Continuation of application No. 11/714,419, filed on Mar. 6, 2007, now Pat. No. 7,789,190.

(30) Foreign Application Priority Data

Mar. 8, 2006 (DE) .......................... 10 2006 010 697

(51) Int. Cl.
*B62D 5/08* (2006.01)

(52) U.S. Cl.
USPC ........................................................ 180/441

(58) Field of Classification Search
USPC ............... 180/403, 421, 441, 442, 417; 91/6; 60/384
See application file for complete search history.

(56) References Cited

U.S. PATENT DOCUMENTS

| | | | |
|---|---|---|---|
| 4,215,720 A | 8/1980 | Becker | |
| 4,345,614 A | 8/1982 | Karlberg et al. | |
| 4,703,819 A | 11/1987 | Hosotani | |
| 4,955,445 A * | 9/1990 | Kauss | 180/406 |
| 5,020,618 A | 6/1991 | Nagao | |
| 5,165,447 A | 11/1992 | Arbjerg et al. | |
| 5,263,321 A | 11/1993 | Thomsen et al. | |
| 5,520,262 A | 5/1996 | Marcott | |
| 6,502,661 B1 * | 1/2003 | Heitzer | 180/403 |
| 6,595,314 B2 * | 7/2003 | Juul et al. | 180/419 |
| 6,655,492 B2 * | 12/2003 | Juul et al. | 180/419 |
| 6,971,472 B2 | 12/2005 | Pedersen et al. | |
| 7,086,413 B2 * | 8/2006 | Yu et al. | 137/493.9 |
| 7,086,494 B2 * | 8/2006 | Yokota et al. | 180/441 |
| 7,997,379 B2 * | 8/2011 | Kryhlmand et al. | 180/441 |
| 2002/0170769 A1 * | 11/2002 | Sakaki et al. | 180/441 |
| 2004/0182636 A1 | 9/2004 | Pedersen et al. | |
| 2005/0205337 A1 * | 9/2005 | Porskrog et al. | 180/417 |
| 2007/0221435 A1 * | 9/2007 | Vernersen et al. | 180/441 |

\* cited by examiner

*Primary Examiner* — Joseph Rocca
*Assistant Examiner* — Daniel Yeagley
(74) *Attorney, Agent, or Firm* — McCormick, Paulding & Huber LLP

(57) ABSTRACT

The invention concerns a hydraulic steering (1) with a steering unit (2) with feedback behavior, a steering motor (8) connected to the steering unit (2) via working pipes (L, R), a steering member (6) and a feedback suppression device (9), which is located in at least one working pipe (L, R). It is endeavored to change the feedback behavior of such a steering in a simple manner. For this purpose, the feedback suppression device (9) has a valve arrangement (10) with hydraulic control inlet (C).

14 Claims, 5 Drawing Sheets

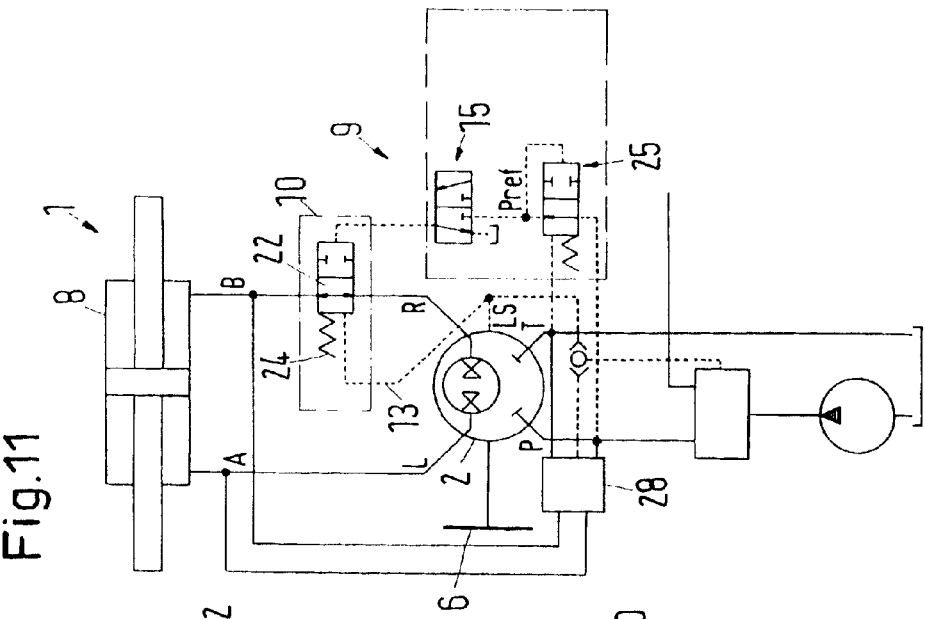
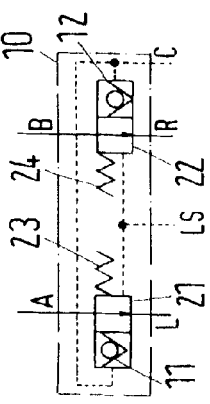
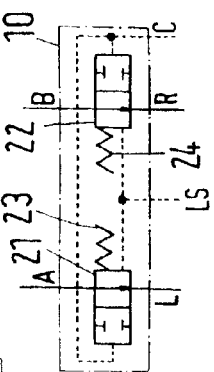
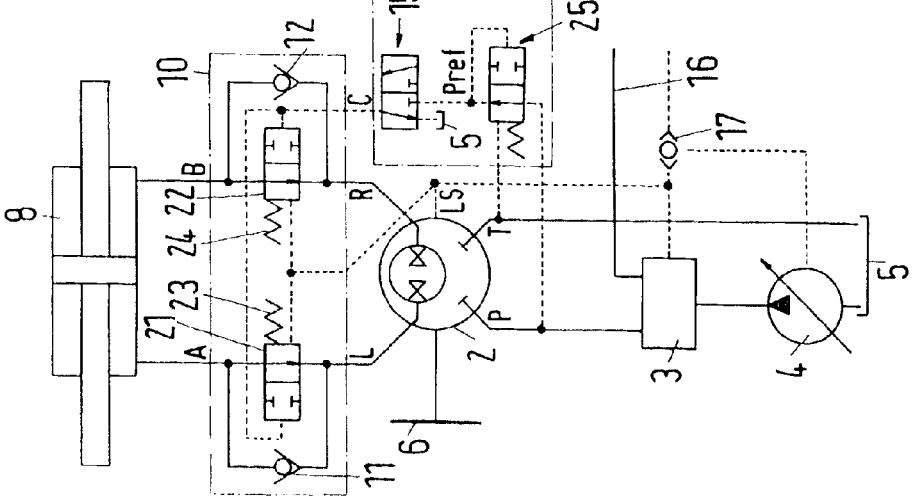

HYDRAULIC STEERING

CROSS REFERENCE TO RELATED APPLICATIONS

This application is a continuation of U.S. application Ser. No. 11/714,419 filed on Mar. 6, 2007, which claims foreign priority benefits under 35 U.S.C. §119 from German Patent Application No. 10 2006 010 697.0 filed on Mar. 8, 2006, the contents of which are incorporated by reference herein.

FIELD OF THE INVENTION

The invention concerns a hydraulic steering with a steering unit with feedback behaviour, a steering motor connected to the steering unit via working pipes, a steering member and a feedback suppression device, which is located in at least one working pipe.

BACKGROUND OF THE INVENTION

Such a steering is known from, for example, DE 10 2004 021 531 A1.

Such a hydraulic steering is preferably used in tractors or other self-propelled working machines, which are driven in different environments. For example, a tractor must be able to drive on a public road to and from a field. Its real work is then performed, when it is driving in the field. When driving in the street a steering behaviour is desired that corresponds to that of a normal vehicle. This means that the driver must be able to feel a feedback of the steered wheels on the steering handwheel. For this purpose, it is necessary that the steering unit has feedback behaviour. Such a steering unit then also has the advantage that a "self alignment" of the vehicle can take place, that is, the steered wheels can automatically move to the straight forward position, which the driver learns by means of the turning of the steering handwheel. In many cases, such feedback behaviour is not desired when driving in the field. Otherwise, the driver would have to constantly act upon the steering handwheel or another steering member with a certain force.

In the steering shown in DE 10 2004 021 531 A1, the feedback suppression device has a valve that is located in a working pipe between the steering unit and the steering motor. This valve is electrically activated and opens, when the steering handwheel is activated. Therefore, a certain effort is required to activate this valve.

SUMMARY OF THE INVENTION

The invention is based on the task of changing the feedback behaviour of a hydraulic steering in a simple manner.

With a hydraulic steering as mentioned in the introduction, this task is solved in that the feedback suppression device has a valve arrangement with hydraulic control inlet.

The valve arrangement that forms a substantial part of the feedback suppression device is thus purely hydraulically activated. An additional electrical system is no longer required to change the feedback behaviour of the steering unit. Hydraulic fluid with the required pressure is available in a hydraulic steering anyway, so that only relatively few additional measures are required to either activate or deactivate the feedback suppression device. When the feedback suppression device is deactivated, the driver feels the forces acting upon the steering motor on the steering member. When the feedback suppression device is activated, the driver does not feel the effects of such forces.

Preferably, the valve arrangement can also be opened by a pressure from the steering unit. With this embodiment it is ensured that the steering unit can also always act upon the steering motor, when the feedback suppression device is active. Thus, the steering unit has a higher priority than the feedback suppression device, so that the feedback suppression device does not have to be disconnected or deactivated to enable a steering.

Preferably, the control inlet is connected to an operation mode valve supplying the control inlet with a higher or a lower control pressure in dependence of its activation. The operation mode valve can simply be a change-over valve that supplies a higher control pressure to the control pressure inlet in one position. Depending on the design of the valve arrangement, this for example causes that the feedback suppression device is connected or activated. When, however, the operation mode valve is changed so that the control inlet of the valve arrangement is supplied with a lower control pressure, the feedback suppression device is deactivated. Of course, also a reversed switching is possible.

Preferably, the valve arrangement has a pretensioning device, which acts against the pressure at the control inlet. Thus, it is ensured that the valve arrangement and thus the feedback suppression device always assume a defined state. Depending on the effect of the control pressure at the control inlet, this causes that the pretensioning device either activates or deactivates the feedback suppression device.

Preferably, for each working pipe the valve arrangement has a valve that interrupts the working pipe in a predetermined state. When the working pipe is interrupted, a feedback of the steering motor upon the steering unit is no longer possible. When the valves are open, the desired feedback behaviour appears. The use of a valve in each working pipe has the advantage that the steering behaviour and also the feedback behaviour are "symmetrical", as the lengths of the hydraulic pipes, which can change their volume when acted upon by a pressure, correspond to each other, when a corresponding valve is located in each working pipe.

Preferably, a series connection of two two-way valves is located between the two working lines, the connecting point of said two-way valves being connected to the control inlet, each two-way valve having an outlet that is connected to the valve in the working pipe not connected to the two-way valve in question. This is a relatively simple method of using the higher of the pressures in the working pipes to open the valve in the other working pipe, as long as the pressure in the working pipe is higher than the pressure at the control inlet. When this is not the case, the valves are acted upon via the pressure at the control inlet.

In an alternative embodiment it may be ensured that a pressure relief valve is allocated to each valve that can be opened by both the pressure at the control inlet and the pressure in the respective other working pipe, and in the opened state connects a closing pressure side of the valve with the related working pipe. As long as the pressure relief valve is closed, the closed valve cannot open, as the pressure on the closing pressure side cannot be removed. This is not possible until the pressure relief valve opens. In this case, the pressure at the control inlet is on the one hand sufficient to open the valve, so that a steering with feedback behaviour is possible. On the other hand, the opening pressure can also be generated by the hydraulic fluid flowing back from the motor.

Preferably, a power assisted steering valve is connected in parallel to the steering unit, the steering valve being connected to the working pipes in an area between the feedback suppression device and the steering motor. The vehicle can then not only be controlled via the steering unit, but also via the steering valve. The steering valve can, for example, be a proportional valve. When the steering motor is controlled via the steering valve, the feedback suppression device is particularly advantageous, as it can prevent a movement of the steering member, which is caused by the activation of the steering motor by the steering valve.

Preferably, the operation mode valve is arranged in series with a pressure control valve. The pressure control valve ensures that the operation mode valve always passes on a predetermined pressure to the control inlet. This is a simple manner of ensuring that the control inlet is neither overloaded by receiving a too high pressure, nor that it is undersupplied, because the pressure is too low. When the pressure control valve is located between a high-pressure connection and the operation mode valve, it can also be ensured that also the operation mode valve only has to be dimensioned in accordance with a predetermined pressure.

Preferably, the steering unit has a load-sensing connection, whose pressure acts upon the valve arrangement against the pressure at the control inlet. Thus, by means of the pressure at the load-sensing connection the effect of the pressure on the control inlet can be neutralized again. As soon as the driver activates the steering member, for example the steering handwheel, thus activating the steering unit, a higher pressure occurs at the load-sensing connection, which usually corresponds to the highest pressure available at the steering unit. In a simple manner, this pressure is able to override the pressure at the control inlet, either directly or indirectly.

It is particularly preferred that the load-sensing connection is connected to an auxiliary valve that is located between a pilot control pipe and a connection with a higher pressure. The connection with the higher pressure can be the supply connection or the high-pressure connection of the steering unit. In this case, the activation of the valve arrangement will cause no large "consumption" of hydraulic fluid. Such consumption could cause a "hard point" in the steering. When the pressure at the load-sensing connection acts upon the auxiliary valve, only a small amount of hydraulic fluid is required to deflect the auxiliary valve or to change its position. This small amount can practically not be felt by the driver or operator. The auxiliary valve has the further advantage that the pressure at the load-sensing connection in the neutral position does not have to be set exactly at the lowest pressure or tank pressure, when the auxiliary valve has a spring or another resetting device acting against the pressure at the load-sensing connection. The pressure at the load-sensing connection would then at least have to overcome the force of the resetting device, before the auxiliary valve is opened.

Preferably, the steering unit has a working pressure connection, relieved in the neutral position of the steering unit to a low-pressure connection and carrying at a predetermined deflection of the steering unit the pressure ruling in the controlled working pipe, a pressure at the working pressure connection acting upon the valve arrangement against the pressure at the control inlet. The pressure at the working pressure connection is also called "S-pressure" or "S-signal". A steering unit with such a working pressure connection is available at Sauer-Danfoss ApS, Nordborg, Denmark, under the name of OSP-EL. This S-signal has the property that, in the neutral position and in a small band around the neutral position, it is relieved to tank or another area with a low pressure. When deflecting to the left or to the right, the S-signal always receives the pressure available at the outlet side of the set of teeth of the steering unit, that is, practically the pressure available in the "left" or "right" working pipe. Thus, a hard point in the steering is avoided, as no hydraulic fluid is consumed by the load-sensing connection. Further, a clearly defined "non-feedback state" is available, as in the neutral position the S-signal is effectively set at the tank pressure. Further, the concept offers an advantage in the emergency steering situation, where a pressure built up in one of the two working pipes will provide an additional certainty for the forced opening of the valve unit.

In an alternative embodiment it is ensured that the steering unit exists in the form of an "open-center" steering unit and has a pressure connection, which is connected to a counter-control connection, whose pressure acts upon the valve arrangement against the pressure at the control inlet. In this connection, you take advantage of the behaviour of an "open-center" steering unit. In the neutral position this steering unit has a connection between the high-pressure connection and the low-pressure connection, so that in the neutral position of this steering unit basically the same pressure rules at both the low-pressure connection and at the high-pressure connection. This pressure is not sufficient to open the valve arrangement. Not until the steering unit is activated, will the connection between the high-pressure connection and the low-pressure connection be interrupted, so that the pressure required to switch the valve arrangement to the feedback mode builds up very quickly.

BRIEF DESCRIPTION OF THE DRAWINGS

In the following, the invention is described on the basis of preferred embodiments with reference to the drawings, showing:

FIG. 8 is a fourth embodiment of a steering, FIG. 9 is a modification of the feedback suppression device according to FIG. 8, FIG. 10 is a second modification of the feedback suppression device according to FIG. 8, FIG. 11 is a fifth embodiment of a steering.

DETAILED DESCRIPTION OF THE INVENTION

Figure 1:
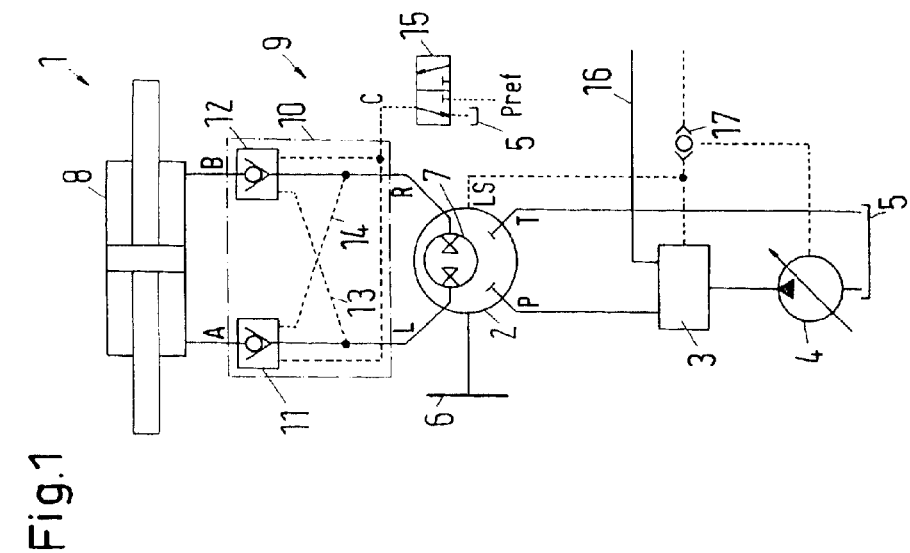
FIG. 1 is a first embodiment of a hydraulic steering with feedback suppression device.

FIG. 1 is a schematic view of a steering 1 with a steering unit 2, here in the form of a "closed-center" steering unit. With a closed-center steering unit a connection between a high-pressure connection P and a low-pressure connection T is interrupted in the neutral position.

The high-pressure connection P is connected to a pump 4 via a priority valve 3, the pump 4 being formed as a variable pump.

Further, the steering unit 2 has the low-pressure connection T, which is connected to a tank 5.

The steering unit 2 is activated by a steering member in the form of a steering handwheel 6. In a manner known per se it has a set of teeth 7 having, for example, an externally toothed gear wheel and an internally toothed gear ring and serves as measuring motor. By means of a directional valve, not shown in detail, pressurised hydraulic fluid can be supplied to one of two working pipes L, R. The working pipes L, R are connected to a steering motor 8, here in the form of a piston-cylinder unit.

Between the steering unit 2 and the steering motor 8 is located a feedback suppression device 9. The feedback suppression device 9 has a valve arrangement 10, which is, in the embodiment according to FIG. 1, provided with a non-return valve 11, 12 that can be opened in each working pipe L, R.

Via a pilot control pipe 13 the working pipe L is connected to the non-return valve 12 in the other working pipe R. Via a pilot control pipe 14 the working pipe R is connected to the non-return valve 11 in the other working pipe L. The pressure in the pilot control pipes 13, 14 opens the non-return valves 11, 12 so that a flow can pass them in a direction from the steering motor 8 to the steering unit 2.

Further, the non-return valves 11, 12 are connected to a control inlet C, so that a pressure ruling at the control inlet C can open the two non-return valves 11, 12.

The control inlet C is connected to an operation mode valve 15, which connects the control inlet C to either the tank 5 or a reference pressure $P_{ref}$. In the shown position of the operation mode valve 15 the control inlet C is relieved to the tank 5. The operation mode valve 15 can be activated mechanically, hydraulically, electrically or otherwise.

With such a steering 1, in which the feedback suppression device 9 comprises the valve arrangement 10 and the operation mode valve 15, it is possible to set either a non-feedback operation or a feedback operation.

In the shown position of the operation mode valve 15, the operation of the steering is non-feedback. The two non-return valves 11, 12 are closed, so that no hydraulic fluid can flow from the steering motor 8 via the connections A, B into the valve arrangement 10. Accordingly, there is no feedback on the steering unit 2.

When, however, the steering unit 2 is activated, for example to deflect the steering motor 8 to the left, the working pipe L is pressurised by the steering unit 2. The pressure in the working line L opens the non-return valve 11 in the working pipe L immediately, so that hydraulic fluid can flow to the left working chamber of the steering motor 8. The fluid displaced from the right working chamber of the steering motor 8 is then displaced to the connection B of the valve arrangement 10. From here, it can flow off, as the non-return valve 12 in the working pipe R has been opened via the pilot control pipe 13.

As soon as the pressure from the steering unit 2 subsides, the two non-return valves 11, 12 close and the steering unit 2 is isolated from the steering motor 8.

When, however, the operation mode valve 15 is moved in the other direction, the control inlet C is acted upon by a reference pressure $P_{ref}$, which opens both non-return valves 11, 12. In this case, the hydraulic fluid displaced from the steering motor 8 is supplied directly into the steering unit 2, where it causes a reaction that can usually also be felt at the steering handwheel 6.

The steering unit 2 also has a load-sensing connection LS, which is on the one side connected to the priority valve 3 and on the other side to the pump 4. Via a branch line 16 the priority valve 3 is connected to a further hydraulic consumer, not shown in detail, which also reports its working pressure to the pump 4 via a two-way valve 17.

The steering 1 works exclusively with hydraulic signals. The valve arrangement 10 of the feedback suppression device 9 is set by activation of the operation mode valve 15 in such a manner that a feedback of the steering motor on the steering unit 2 is either possible or not possible.

Figures 2, 3, 4, 5:
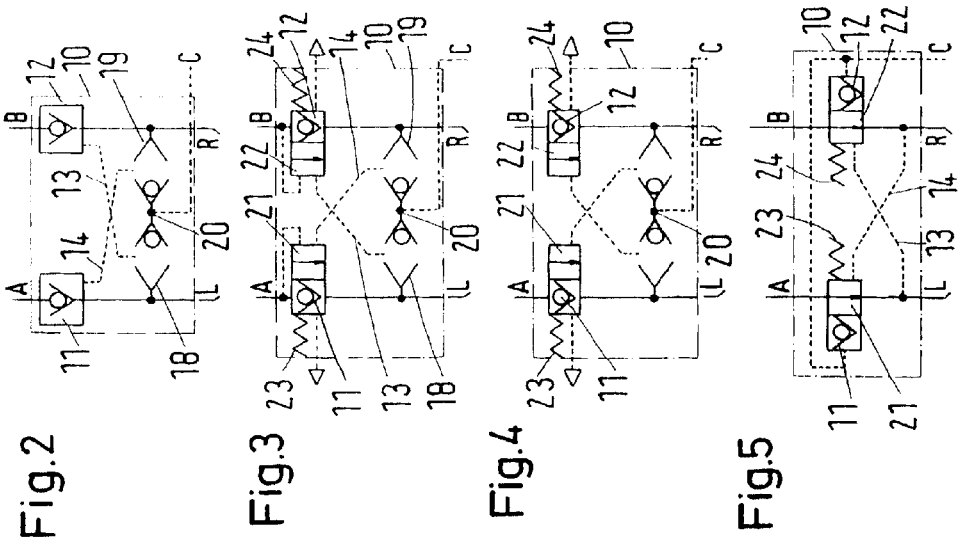
FIG. 2 is a modified embodiment of a feedback suppression device.
FIG. 3 is a third embodiment of the feedback suppression device.
FIG. 4 is a fourth embodiment of the feedback suppression device.
FIG. 5 is a fifth embodiment of the feedback suppression device.

FIG. 2 shows a modified embodiment, in which same or similar elements have the same reference numbers as in FIG. 1.

Two two-way valves 18, 19 are connected in series between the two working pipes L, R. A connecting point 20 between the two two-way valves 18, 19 is connected to the control inlet C. The two-way valve 18, which is connected to the working pipe L, has an outlet, which is connected via the pilot control pipe 13 to the non-return valve 12 that is located in the other working pipe R. In a similar manner, the two-way valve 19, which is connected to the other working line R, has an outlet, which is connected via the pilot control pipe 14 to the non-return valve 11 in the first working pipe L.

The mode of functioning is similar to that in FIG. 1. When, for example, the working pipe L is pressurised by the steering unit 2, the non-return valve 11 is opened immediately by the pressure in the working pipe. The non-return valve 12 in the other working pipe is opened, as the pressure in the working pipe L is led to the non-return valve 12 via the two-way valve 18 and the pilot control pipe 13 in such a manner that the non-return valve 12 opens. In this case, the control inlet C is at a low pressure, that is, the operation mode valve 15 is in the position shown in FIG. 1.

When, however, the control inlet C is brought to a higher pressure by means of the operation mode valve 15, the two two-way valves 18, 19 change over and pass the pressure from the pressure outlet C on to directly open the two non-return valves 11, 12.

FIG. 3 shows an embodiment, in which the non-return valves 11, 12 have been integrated in slides 21, 22 of slide valves. The slides 21, 22 are pressed into the shown position by springs 23, 24, as long as the pressure at the control inlet C is lower than a pressure corresponding to the force of the springs 23, 24. In this case, the valve arrangement 10 according to FIG. 3 works exactly like the valve arrangement 10 according to FIG. 2. In the closed state the non-return valves 11, 12 prevent hydraulic fluid from getting to the steering unit 2 from the steering motor 8. An activation of the steering motor 8 by the steering unit 2, however, is possible.

When the operation mode valve 15 is switched from the position shown in FIG. 1, the two slides 21, 22 are displaced to the position not shown against the force of the springs 23, 24, so that a passage through the working pipes L, R from the steering motor 8 to the steering unit 2 is possible. Also the pressures at the connections A, B of the valve arrangement 10 act in the same direction as the pressure from the control inlet C to open the valves in the working pipes L, R.

The valves 11, 12 have a venting to the environment of the spring chambers, in which the springs 23, 24 are located. This has the advantage that these valves 11, 12 do at the same time act as shock valves, so that the valves located in a following steering unit can still be used.

The embodiment of the valve arrangement 10 in FIG. 4 corresponds to that of FIG. 3. Merely the connection between the connections A, B and the slides 21, 22 are missing.

In the embodiment of the valve arrangement according to FIG. 5 the two springs 23, 24 load the slides 21, 22 so that both working pipes L, R are open, when the operation mode valve 15 is in the position shown in FIG. 1 and the control inlet C is pressure relieved accordingly.

In the embodiments according to the FIGS. 1 to 4 a non-feedback operation is set, when no pressure or only a small pressure is available at the pressure inlet C.

In the embodiment according to FIG. 5, however, a feedback operation is set, when no pressure or only a small pressure is available at the pressure inlet C.

When a high pressure is available at the pressure inlet C, that is a pressure exceeding the force of the springs 23, 24, the slides 21, 22 are displaced so that the non-return valves 11, 12 are positioned in the working pipes L, R. In this case a feedback of the steering motor 8 on the steering unit 2 is no longer possible.

However, a steering through the steering unit 2 is possible. When, for example, the working pipe L is exposed to pressure, the non-return valve 11 opens and the slide 22 is taken to the position shown in FIG. 5 by the pressure in the pilot control pipe 13, so that hydraulic fluid can flow off from the steering motor 8.

Figure 6:
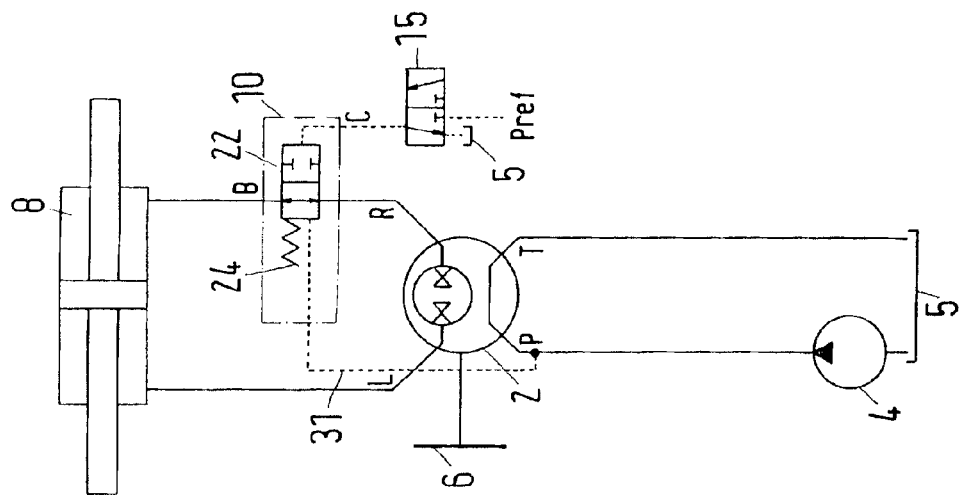
FIG. 6 is a second embodiment of a steering.

Whereas in the embodiments according to FIGS. 1 to 5 the valve arrangement 10 is designed so that it has a valve for each working pipe L, R, this is not the case in the embodiment according to FIG. 6. Here the valve arrangement 10 has only one single valve with a valve slide 22, which is pressed to the opening position by the spring 24, when the pressure at the control inlet C is relieved to the tank 5. When, however, the operation mode valve 15 is switched over, the control inlet is supplied with the reference pressure $P_{ref}$, so that the slide 22 is taken to the closing position and interrupts the working pipe R.

It is favourable, when this valve is located as close to the steering unit 2 as possible.

In the embodiment according to FIG. 6, the steering unit 2 is made as an open-center steering unit, that is, in the neutral position the steering unit 2 has a connection between the pressure connection P and the tank connection T. The pressure connection P is connected to the slide 22 via a counter-control connection 31, so that the pressure in the counter-control connection 31 acts in the same direction as the force of the spring 24.

The force of the spring 24 corresponds to, for example, a pressure of 7 bar. Also the springs 23, 24 in the embodiments according to the FIGS. 3 to 5 can correspond to a pressure of 7 bar. The reference pressure $P_{ref}$ is, for example, 13 bar, so that the slide 22 is displaced to the closing position, when the operation mode valve 15 is switched to the position not shown. In this case a feedback of the steering motor 8 on the steering unit 2 is not possible.

When, however, the steering unit 2 is activated, the connection between the pressure connection P and the tank connection T is interrupted, so that the pressure at the pressure connection P rises very quickly to the outlet pressure of the pump 4. At least together with the force of the spring 24 this outlet pressure exceeds the pressure $P_{ref}$, so that for the steering the slide 22 can be taken to the opening position.

Figure 7:
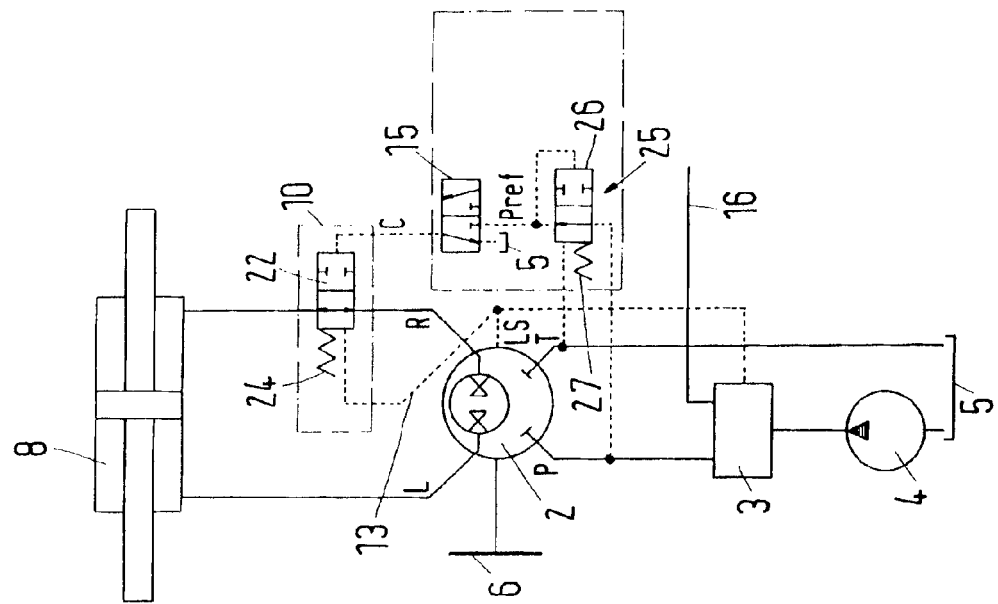
FIG. 7 is a third embodiment of a steering.

In the embodiment according to FIG. 7 a closed-center steering unit 2 is used, in which a connection between the pressure connection P and the tank connection T does not exist in the neutral position either.

The steering unit 2 according to FIG. 7 has a load-sensing connection LS, which acts upon the slide 22 of the valve arrangement 10 via the pilot control pipe 13 in the same direction as the spring 24.

In the shown switching position of the slide 22 the working pipe R is open for passage. Due to the position of the operation mode valve 15 the pressure at the tank 5 rules at the control inlet C. In this case a feedback steering behaviour occurs.

When the operation mode valve 15 is switched over, the reference pressure $P_{ref}$ reaches the control inlet C and switches the slide 22, so that the working pipe R is interrupted. In this case a feedback of the steering motor 8 on the steering arrangement 2 is not possible. When, however, the steering arrangement 2 is activated, the pressure at the load-sensing connection LS increases and together with the spring 24 it opens the working pipe R in that the slide 22 is displaced to the position shown.

In FIG. 7 the reference pressure $P_{ref}$ is set by means of a pressure control valve 25, for example at a value of 13 bar. The pressure control valve 25 has a valve slide 26, which is loaded in the opening direction by the force of a spring 27 and the pressure at the tank connection T. In the closing direction the valve slide 26 is loaded by the pressure at the outlet of the pressure control valve 25. The inlet of the pressure control valve 25 is connected to the pressure connection P.

The value of the reference pressure $P_{ref}$ can then be set by selecting the force of the spring 27.

FIG. 8 shows that the pump 4 is a variable capacity pump, which is controlled by the pressure at the load-sensing connection LS. Of course, also here an embodiment is possible with a pump 4 having a fixed displacement, that is, an embodiment as in FIG. 7.

In each working pipe the valve arrangement 10 has a non-return valve 11, 12. Further, in each working pipe the valve arrangement 10 has a valve slide 21, 22 arranged in parallel, which is pressed into the opening position against the force of the springs 23, 24 (shown). In this case a feedback steering is possible, as a direct connection between the steering motor 8 and the steering unit 2 is permanently available.

Only when the operation mode valve 15 is switched so that the reference pressure $P_{ref}$ reaches the control inlet C, the slides 21, 22 are displaced against the force of the springs 23, 24, so that the working pipes L, R are interrupted. In this case there is no feedback of the steering motor 8 on the steering unit 2.

However, the steering unit 2 can still activate the steering motor 8. In the "forward" direction the non-return valve 11, 12 in the related working pipe is opened. In the "return" direction the slide 22 is opened by the pressure at the load-sensing connection LS.

The FIGS. 9 and 10 show modified embodiments of the valve arrangements.

In the embodiment according to FIG. 9 the non-return valves 11, 12 are integrated in the slides 21, 22.

In the embodiment according to FIG. 10 non-return valves are not available. The feedback suppression occurs exclusively through the slides 21, 22, which are opened by the force of the springs 23, 24 to ensure feedback behaviour, when the control inlet C is not under pressure. When, however, by means of the operation mode valve 15 pressure is acting upon the slides 21, 22, the slides move against the force of the springs 23, 24 in the closing direction. In this case, an opening of the working pipes L, R is only possible, when the steering unit 2 generates a correspondingly high pressure at the load-sensing connection LS, which exceeds the pressure at the control inlet C.

FIG. 11 shows a steering 1, which substantially corresponds to that in FIG. 7. Further, it has a steering valve 28, which is located in parallel to the steering unit 2 between the pressure connection P and the tank connection T on the one side and the steering motor 8 on the other side. The steering valve 28 ends in the working pipes L, R between the valve arrangement 10 and the steering motor 8, so that the fluid from the steering valve 28 is not influenced by the valve arrangement 10.

When the pressure at the load-sensing connection LS is used to activate the valve arrangement 10 directly, a so-called "hard point" may occur during steering. At the instant, when the valve arrangement 10 is activated, a small amount of hydraulic fluid will be missing, which can be felt at the steering handwheel 6.

Figure 12:
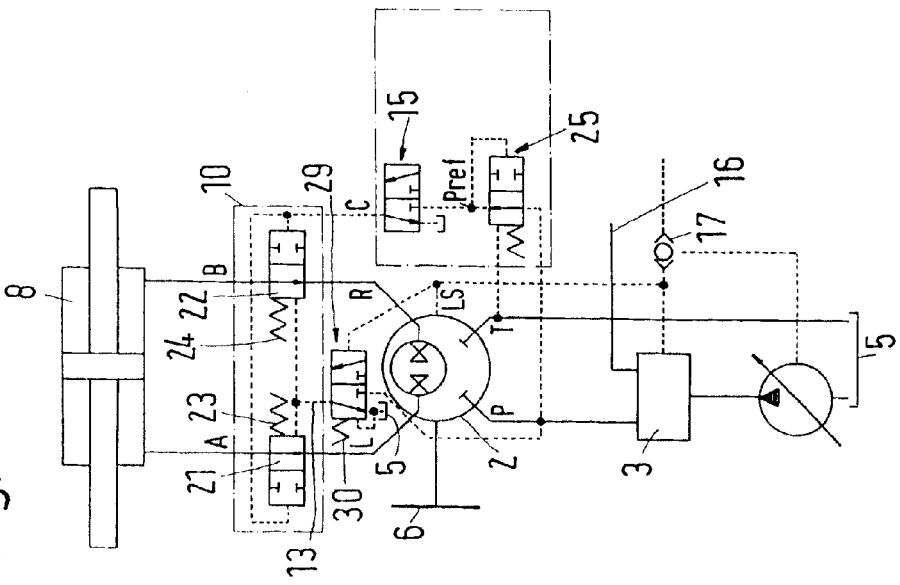
FIG. 12 is a sixth embodiment of a steering.

To remedy this problem, the embodiment according to FIG. 12, which otherwise corresponds to the embodiment according to FIG. 8 that is supplied with a valve arrangement according to FIG. 10, is provided with an auxiliary valve 29. The auxiliary valve 29 is activated by the pressure at the load sensing connection LS and then creates a connection between the pressure connection P and the pilot control pipe 13, so that the slides 21, 22 are acted upon by the pressure of the pressure connection P against the pressure at the control inlet C. The auxiliary valve 29 is switched by an auxiliary valve spring 30, so that the pilot control pipe 13 is connected to the tank 5 again.

This embodiment has two substantial advantages. Firstly, the amount of hydraulic fluid required to switch over the auxiliary valve 29 is substantially smaller than the amount of hydraulic fluid required to switch over the two slides 21, 22. Accordingly, no "hard point" occurs during steering.

Secondly, with this embodiment it is no longer required that the load sensing connection LS carries the same pressure as the tank 5, when the steering unit 2 is in the neutral position. As long as the pressure at the load-sensing connection LS does not exceed the force of the spring 30, the auxiliary valve 29 remains in the position, in which the pilot control pipe 13 is isolated from the pressure connection P, so that the positions of the slides 21, 22 controlled by the operation mode valve 15 remain unchanged.

Figure 13:
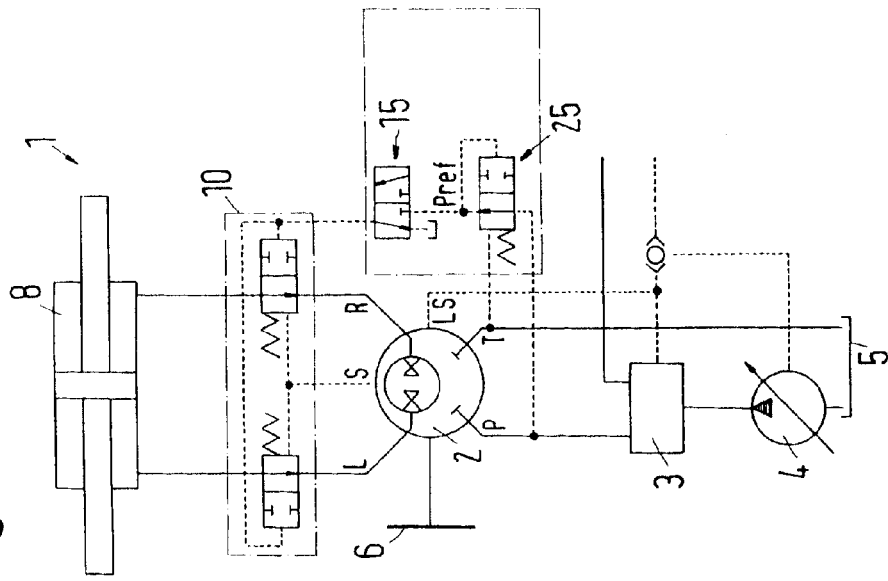
FIG. 13 is a seventh embodiment of a steering.

FIG. 13 shows a further amended steering 1, in which the valve arrangement 10 corresponds to that in FIG. 12.

Figure 14A:
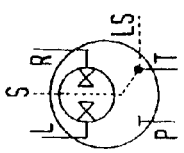
FIG. 14 is a schematic view explaining the S-signal.
Figure 14B:
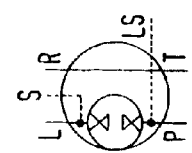
Figure 14C:
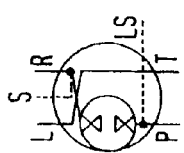

The design of the steering unit has changed. It has a working pressure connection S, from which an "S-pressure" or an "S-signal" can be obtained, which will be explained by means of FIG. 14.

In the neutral position (FIG. 14a) the S-signal corresponds to the pressure at the low-pressure connection T. This connection also remains in a small band around the neutral position. In this case, the pressure at the load-sensing connection LS corresponds to the pressure at the tank connection T.

When the steering unit 2 is activated so that the left working pipe L is exposed to pressure (FIG. 14b), the S-pressure or the S-signal corresponds to the pressure in the left working pipe L.

When the right working pipe R is exposed to pressure (FIG. 14c), the S-signal corresponds to the pressure in the right working pipe R.

Also with this working pressure connection S a hard point in the steering is avoided, as no pressure from the load-sensing connection LS is required to activate the valve arrangement 10. Further, it gives a well defined non-feedback operation, as in the neutral position the S-signal is effectively set at the pressure at the tank connection T.

Further, a steering arrangement with the working pressure connection S is advantageous in an emergency steering situation, where the pressure built up at the working pressure connection S provides further safety for the opening of the valves in the working pipes L, R, at least in one of the working pipes L, R.

Figure 15:
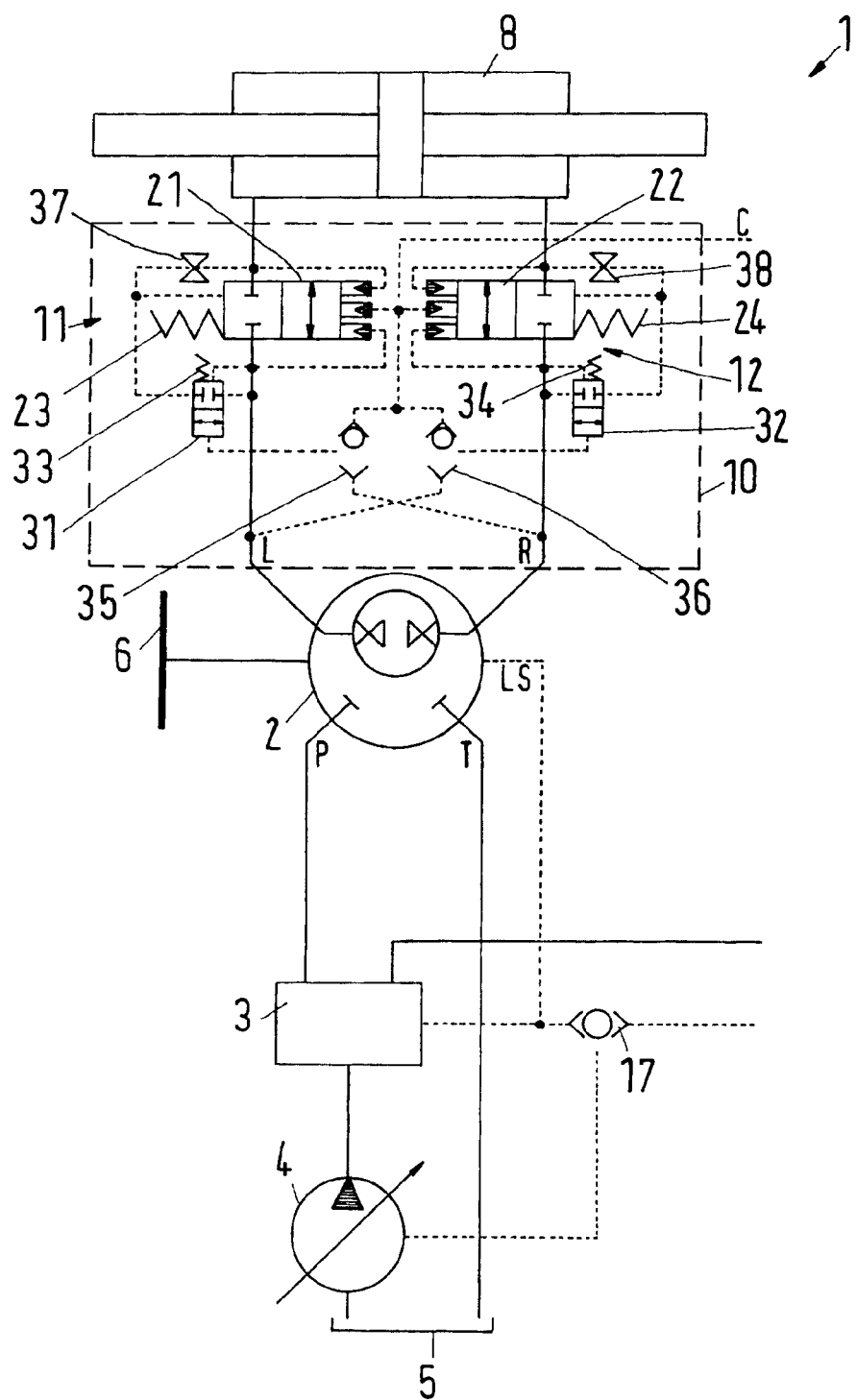
FIG. 15 is an eighth embodiment of a steering.

FIG. 15 shows an eight embodiment of a steering 1, in which a pressure relief valve 31, 32 is allocated to each valve 11, 12. Each pressure relief valve is retained in a closed position by a spring 33, 34.

In the direction against the springs 33, 34 acts the pressure at the outlet of a two-way valve 35, 36. Each two-way valve 35, 36 is on the one side connected to the respectively other working pipe R, L, that is the working pipe to which the pressure relief valve 31, 32 is not connected. On the other side the two-way valves 35, 36 are connected to the control inlet C.

The valve slides 21, 22 of the valves 11, 12 are loaded in the closed position by the two springs 23, 24.

On the opposite side of the slide 21, 22, that is, in the closing direction, acts the pressure at the control inlet C or the pressure in the working pipe L, R allocated to the valve 11, 12, respectively.

Also in the opening direction acts a pressure at the outlet of the valves 11, 12. This pressure originates from the motor 8, when hydraulic fluid is displaced from the motor 8.

Via a throttle 37, 38 the outlets of the valves 11, 12 are connected to the side of the valve slides 21, 22, upon which also the springs 23, 24 act. At the same time, this side is connected to a pressure relief valve 31, 32.

This steering 1 now works as follows:

When a pressure is available at the control inlet C, which exceeds the force of the springs 23, 24, the pressure at the control inlet C opens the pressure relief valves 31, 32, so that the slides 21, 22 of the valves 11, 12 are moved to the opening position. Then the steering 1 works with feedback behaviour.

When the pressure at the control inlet C drops so that it is below a pressure corresponding to the force of the springs 23, 24, the valves 11, 12 are closed, as shown.

When, now, the steering arrangement 2 is activated, for example to expose the working pipe R to pressure, the valve 12 allocated to this working pipe R is opened, as the pressure in the working pipe R acts upon the slide 22 in the opening direction.

At the same time the pressure relief valve 31, which is allocated to the other valve 11, is opened via the two-way valve 35. Accordingly, hydraulic fluid flowing back from the motor 8 can act upon the slide 21 in the opening direction. The pressure here is higher than the pressure in the closing direction, as the hydraulic fluid flowing off through the pressure relief valve 31 causes a pressure drop at the throttle 37. Accordingly, the valve 11 is also opened and the motor 8 can be activated.

In all embodiments the steering unit 2 in itself has feedback behaviour, that is, a pressure change at its outlets, which are connected to the working pipes L, R, causes that the steering member 6 moves in dependence of the amount of hydraulic fluid flowing in or out. This feedback behaviour is desired in many cases, but undesired in many other cases. To enable connection or disconnection of this feedback behaviour without changing the steering unit 2, the feedback suppression device 9 can be operated in a purely hydraulic manner.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A hydraulic steering comprising:
   a steering unit with feedback behaviour;
   a steering motor connected to the steering unit via working pipes;
   a steering member; and
   a feedback suppression device,
   wherein the feedback suppression device is located in at least one of the working pipes,
   wherein the feedback suppression device includes a valve arrangement with a hydraulic control inlet, and
   wherein the feedback suppression device may be activated or deactivated as a function of control pressure at the hydraulic control inlet.

2. The steering according to claim 1, wherein the valve arrangement can also be opened by a pressure from the steering unit.

3. The steering according to claim 1, wherein the control inlet is connected to an operation mode valve supplying the control inlet with a higher or a lower control pressure in dependence of activation of the operation mode valve.

4. The steering according to claim 3, wherein the operation mode valve is arranged in series with a pressure control valve.

5. The steering according to claim 1, wherein for each working pipe the valve arrangement has a valve that interrupts the working pipe in a predetermined state.

6. The steering according to claim 5, wherein a series connection of two two-way valves is located between the two working pipes, the connecting point of said two-way valves being connected to the control inlet, each two-way valve having an outlet that is connected to the valve interrupting the working pipe of the other two-way valve.

7. The steering according to claim 1, wherein a power assisted steering valve is connected in parallel to the steering unit, the steering valve being connected to the working pipes in an area between the feedback suppression device and the steering motor.

8. The steering according to claim 1, wherein the valve arrangement has a pretensioning device, which acts against a pressure at the control inlet.

9. The steering according to claim 1, wherein the steering unit has a load-sensing connection, whose pressure acts upon the valve arrangement against the pressure at the control inlet.

10. The steering according to claim 9, wherein the load-sensing connection is connected to an auxiliary valve that is located between a pilot control pipe and a connection with a higher pressure.

11. The steering according to claim 1, wherein the steering unit has a working pressure connection, relieved in the neutral position of the steering unit to a low-pressure connection and carrying at a predetermined deflection of the steering unit the pressure ruling in the deflected working pipe, a pressure at the working pressure connection acting upon the valve arrangement against the pressure at the control inlet.

12. The steering according to claim 1, wherein the steering unit exists in the form of an "open-center" steering unit and has a pressure connection, which is connected to a counter-control connection, whose pressure acts upon the valve arrangement against the pressure at the control inlet.

13. The steering according to claim 1, wherein the valve arrangement is further adapted to be operated by pressure from the steering unit.

14. The steering according to claim 1, wherein the control inlet is connected to an operation mode valve that supplies the control inlet with a control pressure.

* * * * *